United States Patent [19]

Whiteside et al.

[11] Patent Number: 5,198,805
[45] Date of Patent: Mar. 30, 1993

[54] METHOD AND APPARATUS FOR MONITORING A NETWORK AND LOCATING A NODE USING SIGNAL STRENGTH CALCULATIONS

[75] Inventors: Charles H. Whiteside; Stephen M. Ernst, both of Colorado Springs, Colo.

[73] Assignee: Hewlett-Packard Company, Palo Alto, Calif.

[21] Appl. No.: 844,964

[22] Filed: Feb. 28, 1992

Related U.S. Application Data

[63] Continuation of Ser. No. 577,396, Sep. 4, 1990, abandoned.

[51] Int. Cl.⁵ .................... G01R 31/08; H04J 3/14
[52] U.S. Cl. .................... 340/825.06; 324/522; 364/571.05; 370/14; 370/17; 455/67.1
[58] Field of Search ............ 340/825.52, 825.54, 340/825.06, 825.07; 370/13, 14, 15, 17, 92; 324/534, 535, 522; 455/5, 9, 67; 178/2 R; 364/571.05

[56] References Cited

U.S. PATENT DOCUMENTS

| | | | |
|---|---|---|---|
| 4,161,628 | 7/1979 | McRae | 370/17 |
| 4,229,734 | 10/1980 | Schultz | 340/825.54 |
| 4,279,032 | 7/1981 | Smith | 370/17 |
| 4,430,788 | 7/1982 | Sbuelz | 370/17 |
| 4,558,358 | 12/1985 | Onda | 455/5 |
| 4,694,453 | 9/1987 | Kobayashi et al. | 370/92 |
| 4,730,302 | 3/1988 | Fuerlinger et al. | 370/17 |
| 4,799,211 | 1/1989 | Felker et al. | 370/17 |
| 4,816,825 | 3/1989 | Chan et al. | 340/825.06 |
| 4,860,001 | 8/1989 | Yamanaka et al. | 340/825.07 |
| 4,890,278 | 12/1989 | Felker et al. | 178/2 R |
| 4,896,315 | 1/1990 | Felker et al. | 178/2 R |
| 4,926,162 | 5/1990 | Pickell | 340/825.06 |
| 5,048,009 | 9/1991 | Conrad | 370/13 |
| 5,115,199 | 5/1992 | Yamasishi | 370/17 |

FOREIGN PATENT DOCUMENTS

| | | |
|---|---|---|
| 0381878 | 2/1989 | European Pat. Off. . |
| 0358488A3 | 9/1989 | European Pat. Off. . |

*Primary Examiner*—Donald J. Yusko
*Assistant Examiner*—John Giust
*Attorney, Agent, or Firm*—Guy J. Kelley

[57] ABSTRACT

Disclosed is a system that monitors the signal strength of each transmission by a node on a LAN cable of a local area network and determines the location of the node sending the signal. This system has a monitor at each end of the LAN cable, with one of the monitors typically being located in a computer node attached to the cable. When an information frame is sent on the cable, each of the monitors records the signal strength of the frame preamble and the source address contained within the frame. The distance to the node from a first end of the cable, expressed as a percentage of the length of the cable, is the ratio of the signal strength at the second end of the cable to the sum of the signal strengths.

19 Claims, 8 Drawing Sheets

METHOD AND APPARATUS FOR MONITORING A NETWORK AND LOCATING A NODE USING SIGNAL STRENGTH CALCULATIONS

CROSS REFERENCE TO RELATED APPLICATION

This is a continuation of copending application Ser. No. 07/577,396 filed on Sep. 4, 1990, now abandoned.

FIELD OF THE INVENTION

This invention relates to computer systems and more particularly to computer networks. Even more particularly, the invention relates to a method and apparatus for monitoring the location of nodes on a computer network.

BACKGROUND OF THE INVENTION

Computer Networks, called Local Area Networks (LANs), are increasingly popular in any environment where more than one computer is being used. Within the IEEE 802.3 protocol (Ethernet), each segment of the LAN can be up to 185 or 500 meters long, depending upon the type of connecting cable that is used. The length of the cable is the limiting factor, not the number of nodes attached to the cable. Up to 30 or 100 nodes may be attached to a segment. Because of this length, a single segment often includes an entire office, and sometimes an entire building with the cable running through cable raceways, between walls and between floors.

The IEEE 802.3 protocol is a carrier sense multiple access /collision detect (CSMA/CD) type of protocol which allows all nodes to timeshare the same cable. When a first node wants to send information to another node, the first node listens for a carrier (meaning that some other node is sending) and if no carrier is sensed, the first node begins to transmit. If two nodes begin transmission at the same time, a collision will occur and both nodes will detect the collision and stop sending. Each node will try again later. Thus all nodes use the same cable without interfering with each other.

If a node is defective it may start sending without first listening for a carrier, which will frequently cause a collision. Also, each information packet sent on the cable is limited in length, and a defective node may send a frame that is too long, causing chatter. A defective node may also send a signal with a signal level too low to be detected by other nodes. Many other problems can, and often do, occur on a segment. When a problem occurs, a system administrator needs to know which node is causing the problem. Since all nodes use the same cable, and since this cable may extend for up to 500 meters through walls, cable conduits, and building floors, the administrator has a difficult task in finding the defective node.

Networks are very dynamic, usually growing. New nodes are constantly being connected and sometimes older nodes are being removed. Thus, in order to have an accurate map, the network administrator has to constantly update the number and location of nodes on the network.

One prior art device that is used to assist an administrator in mapping the nodes along a cable is a time domain reflectometer. This device will locate the end of a cable by transmitting a signal pulse down the cable and measuring the time necessary to see a signal reflected from the end of the cable. Using this device, however, requires that the cable be disconnected from each node, thus making the node the end of the cable, in order to measure the cable distance to the node. This type of device will provide no help in locating a defective node.

Some prior art devices locate nodes by inserting additional information at the end of an information frame, and measuring the time for the additional information to reach a selected point on the segment. Since some other devices connected to the network respond negatively to this additional information, this method is not always usable.

There is a need in the art for a system to locate nodes on a network segment. There is a further need for such a system that does not insert information onto the network during the location process. A still further need is for such a system that may be used while the network is in operation, without disturbing the users of the network. Yet another need is for a system to detect nodes that transmit with a low signal level. The present invention meets these needs.

SUMMARY OF THE INVENTION

It is an aspect of the present invention to monitor signals on a segment of an IEEE 802.3 computer local area network.

It is another aspect of the invention to monitor such signals while maintaining the specifications of the network.

Another object of the invention is to measure the signal strength of the signal transmitted by each node connected to the network segment.

Another aspect is to calculate the location of each node located on a segment of the network, based on the signal strength of the signal transmitted by each node.

Another aspect is to calculate the location of a node by measuring the signal strength from such node at two points on the network segment, and calculate the distance from the node to the center of the cable.

Another aspect is to display to a user or network manager of such network the location of any node.

A further aspect of the invention is to monitor signal strength of a node each time a node sends an information frame on the network, and to report any node transmitting with a low signal strength.

The above and other aspects of the invention are accomplished in a system that monitors the signal strength of each transmission on the LAN cable. This system has a monitor at each end of the LAN cable, with one of the monitors typically being located in a computer node attached to the cable. When an information frame is sent on the cable, each of the monitors records the relative signal strength of the frame and the source address contained within the frame. The ratio of the signal strengths is then calculated and this ratio is used to determine the location of the node that sent the frame on the network.

Each LAN monitor has a filter that filters the incoming signal, sends the filtered signal to a sample and hold circuit, which in turn sends the signal to an analog-to-digital converter. In parallel with these elements, a phase locked loop extracts the data and clock from the signal, and a source address stripper circuit removes the source address from the information frame. Once the source address has been removed, and the signal strength level converted to a digital value, the source address and signal level are stored in a first-in-first-out (FIFO) buffer.

The data from each of the FIFO's in each of the LAN monitors is collected by software that correlates the two values of signal strength level by using the source address recorded in the FIFO. Once the signal strength level at the two ends of the cable has been determined, the location of the node from the center of the cable can be determined. The length of the cable can also be determined if one of the signals has a signal strength that is equal to the maximum allowable on the cable, since the node sending this signal must be at one end of the cable, and twice the distance between it and the center will be the cable length.

The software maintains a table of all nodes that have transmitted over a period of time, and can display a graphic of the network showing each node at its location on the cable. Also, if the signal received from a particular node falls below the required minimum level, the software will display the address and location of the defective node to the network administrator.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
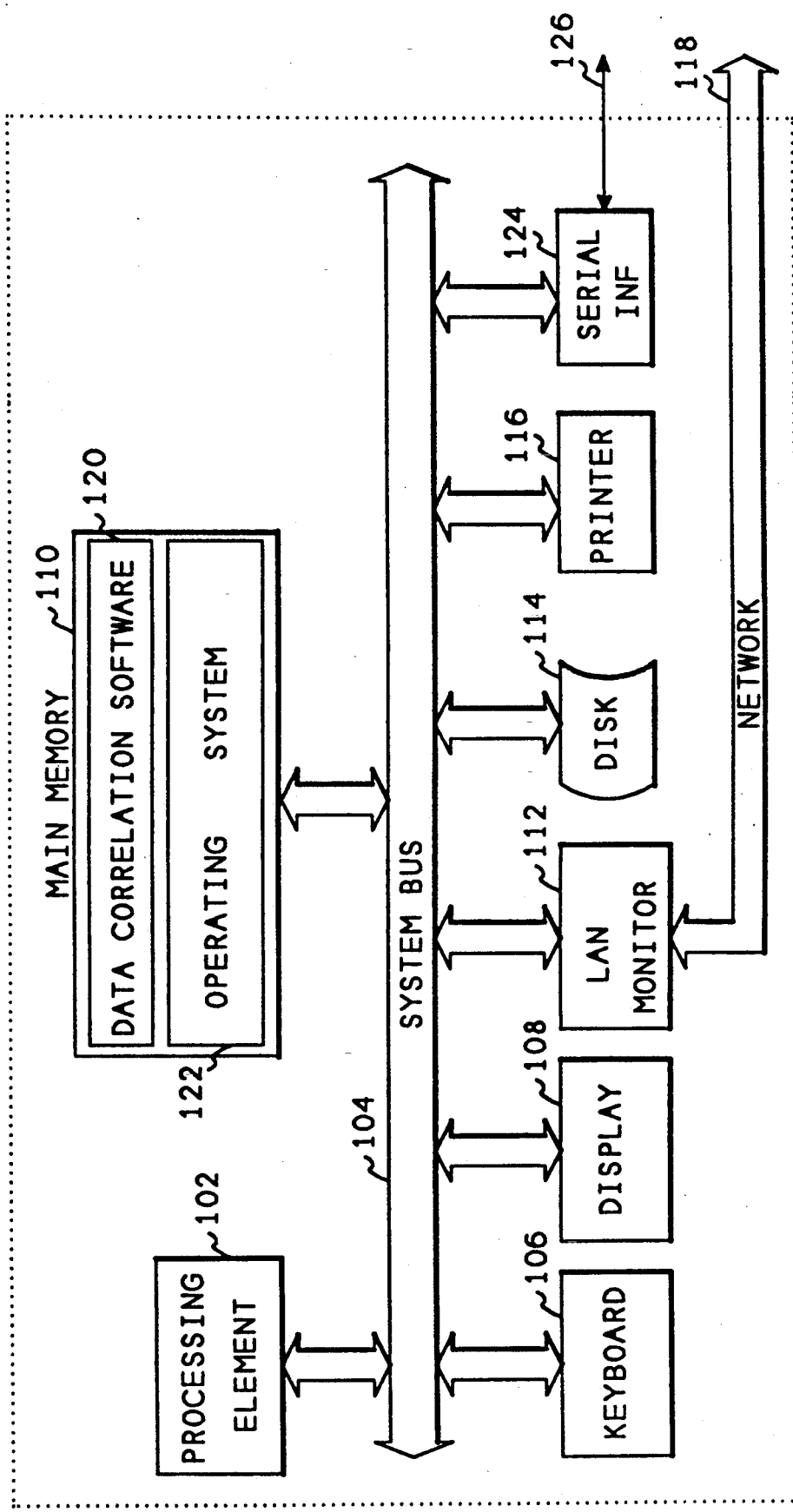
FIG. 1 shows a block diagram of a computer system incorporating the present invention.

FIG. 1 shows a block diagram of a computer system incorporating the present invention. Referring now to FIG. 1, a computer system 100 contains a processing element 102. The processing element 102 communicates to other components of the computer system 100 over a system bus 104. A keyboard 106 is used to accept textual information from a user of the system, typically the network administrator. A display 108 is used to output information to the network administrator, and may have the ability to output graphics information. A main memory 110 contains the data correlation software 120 which interfaces to the rest of the system through the operating system 122. The data correlation software 120, operating system 122, and the tables of information regarding the network are stored on a disk 114. A printer 116 is used to produce a hardcopy of the results of the data correlation software.

Network monitor 112 collects and analyzes each information frame sent over the network 118, and thus is connected to one end of the network 118. A similar network monitor is connected to the other end of network 118 and it sends its data back to the computer system 100 via a serial interface 124 and a serial cable 126.

Figure 2:
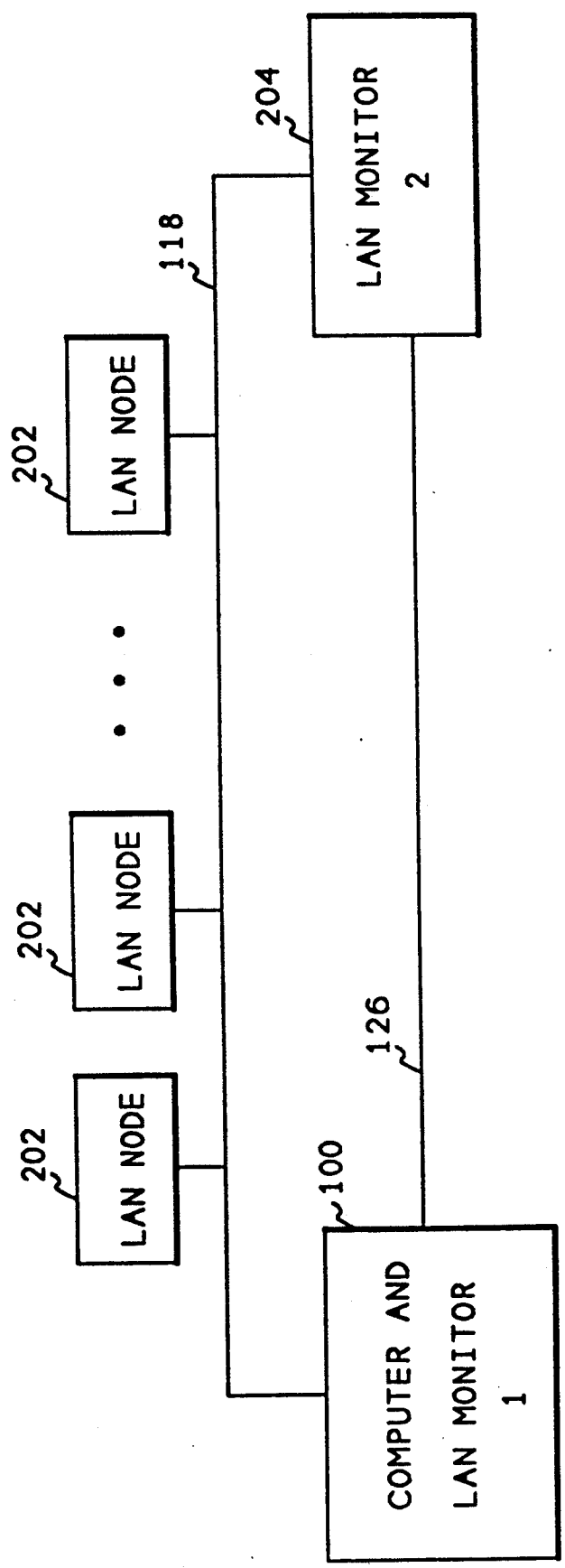
FIG. 2 shows a diagram of a computer network incorporating the invention.

FIG. 2 shows a diagram of a computer network incorporating the present invention. Referring now to FIG. 2, the computer system 100 is shown with the LAN monitor 112 (not shown) contained inside. The local area network 118 extends from the computer 100 and connects to several LAN nodes 202. The LAN 118 terminates at its other end with a second LAN monitor 204. The LAN monitor 204 collects information and sends that information back to the computer system 100 over a serial interface 126.

The LAN monitor 204 could use other methods to send its information to the computer system 100. For example, the LAN monitor could use the LAN 118 to transmit the information, or it could store the information on magnetic media which would be removed and taken to the computer system 100. Also, both LAN monitors could be separated from the computer system 100 and could send their information to the computer by any of the above described methods.

It is important, however, that the two LAN monitors be located at each end of the LAN cable. If the LAN monitors exist at other locations, they will only be accurate for nodes that are located between the two LAN monitors, and will provide inaccurate locations for nodes existing outside the two LAN monitors.

Figure 3:
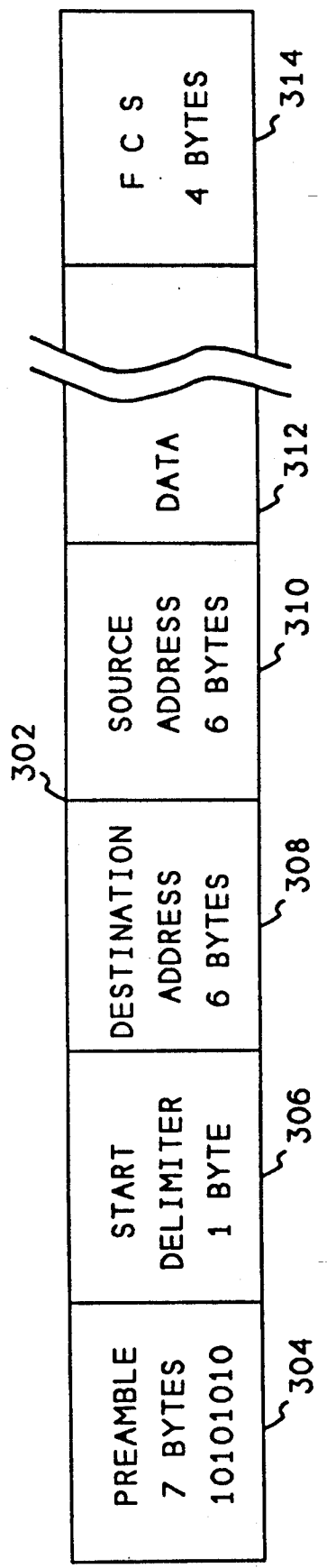
FIG. 3 shows a diagram of a prior art information frame for an IEEE 802.3 computer network.

FIG. 3 shows a diagram of a prior art information frame for the IEEE 802.3 computer network. Referring now to FIG. 3, an information frame 302 starts with a preamble 304. The preamble 304 has seven bytes of the bit pattern 10101010. Following the preamble 304 is a start delimiter which is one byte containing the binary pattern 10101011. Following the start delimiter 306 is the destination address 308, which is six bytes long. Following the destination address is the source address 310 which is also six bytes long. Next follows the data portion 312 of the frame, which can vary in length from 48 bytes to 1502 bytes. The last information in the frame is the frame check sequence which is four bytes of error correction code redundancy data.

Figure 4:
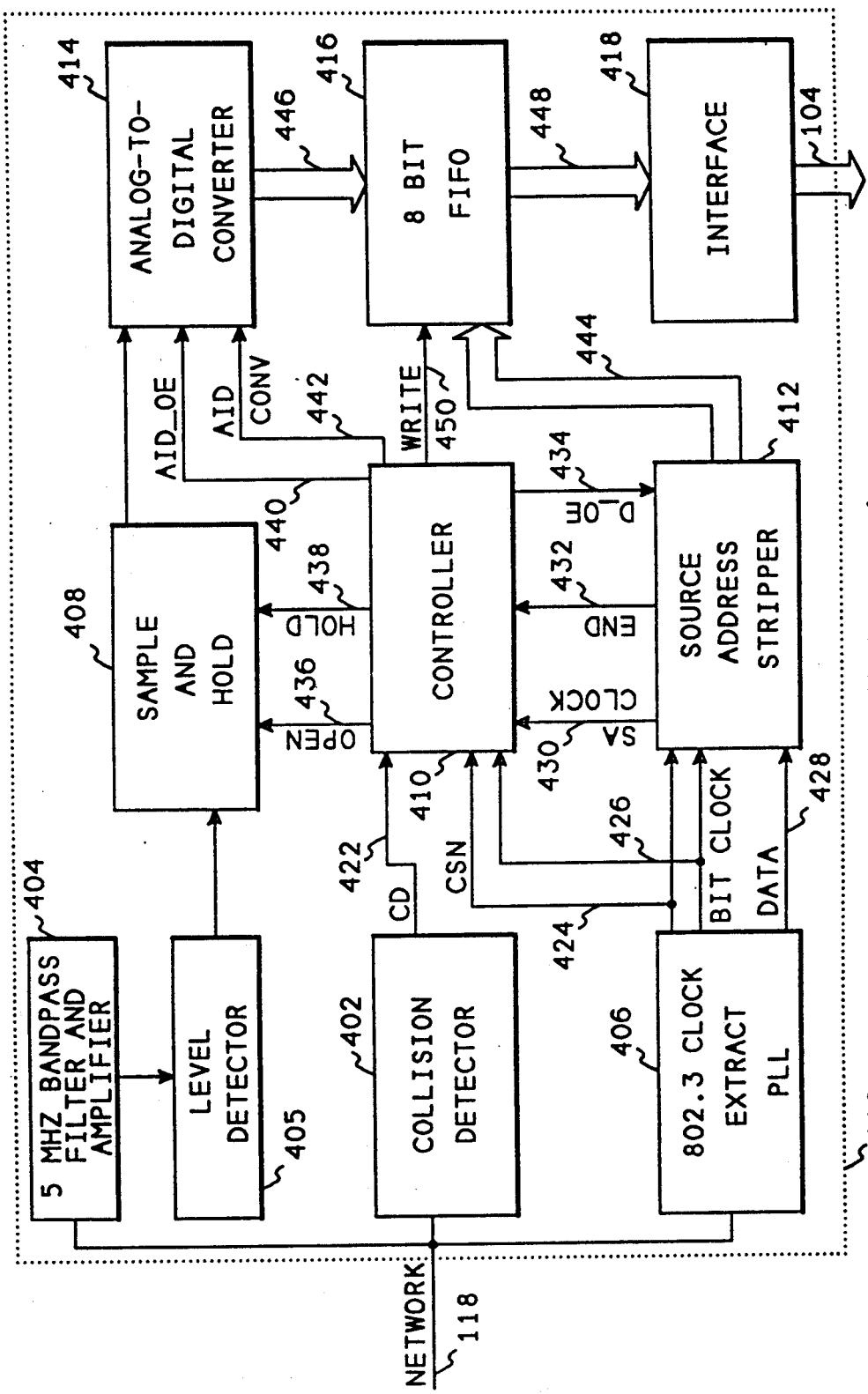
FIG. 4 shows a block diagram of the circuit of the present invention.

FIG. 4 shows a block diagram of the LAN monitor circuit 112 of FIG. 1. Referring now to FIG. 4, the LAN monitor circuit 112 contains a collision detector 402 which receives the network 118. The collision detector 402 monitors the network 118 and whenever a collision occurs, the collision detector 402 sends a CD signal 422 to the controller 410. The maximum transmission rate of the network 118 is ten megabits per second, however, because of the data pattern contained in the preamble 304 (FIG. 3) the preamble frequency is five megabits per second. The five megahertz filter and amplifier circuit 404 receives the signal from the network 118, removes all harmonics and DC bias within the five megabit per second preamble, and amplifies the signal before sending it to the level detector 405 which sends a level to the sample and hold circuit 408. The sample and hold circuit 408 receives the signal from the level detector 405 and holds the signal level until the analog-to-digital converter 414 can process the analog signal.

Also connected to the network 118, is the clock extract phase locked loop circuit 406. The circuit 406 extracts the serial data 428 from the information on the network 118 and extracts a bit clock 426, which is used to synchronize the serial data 428. The clock extract PLL 406 also detects when information is being sent on the network 118 and outputs a carrier-sense signal 424 which goes to the controller 410 and the source address stripper circuit 412. The serial data 428 goes to the source address stripper circuit 412 which monitors the data 428 and extracts the source address from that data. The source address stripper 412 sends a source address clock signal 430 which is a derived signal that clocks each byte of the source address. The source address stripper 412 also sends an end signal 432 after all bytes of the source address have been clocked by the source address clock 430.

A controller circuit 410 provides all the signals necessary to control the other circuits and collect data into the FIFO 416. The controller 410 sends an open signal 436 to the sample and hold circuit 408 after carrier is detected. The open signal 436 tells the sample and hold circuit 408 to start the sample period. After 32 clock bits, the controller 410 sends a hold signal 438 to tell the sample and hold circuit 408 to hold the analog level. The controller 410 sends a D_OE signal 434 to the source address stripper 412 to cause the source address stripper 412 to gate parallel data 444 into the FIFO 416. The controller 410 sends an A/D CONV signal 442 to the analog-to-digital converter circuit 414 to tell it to convert the analog signal into a digital value. When the controller 410 is ready to store the converted level value into the FIFO, it sends the A/D_OE signal 440 to the analog-to-digital converter circuit 414. After gating the appropriate data to the FIFO 416, controller 410 sends a write signal 450 to the FIFO 416.

After data has been stored in the FIFO 416, the computer system 100 can retrieve that data over the parallel bus 448 and the interface circuit 418.

Figure 5:
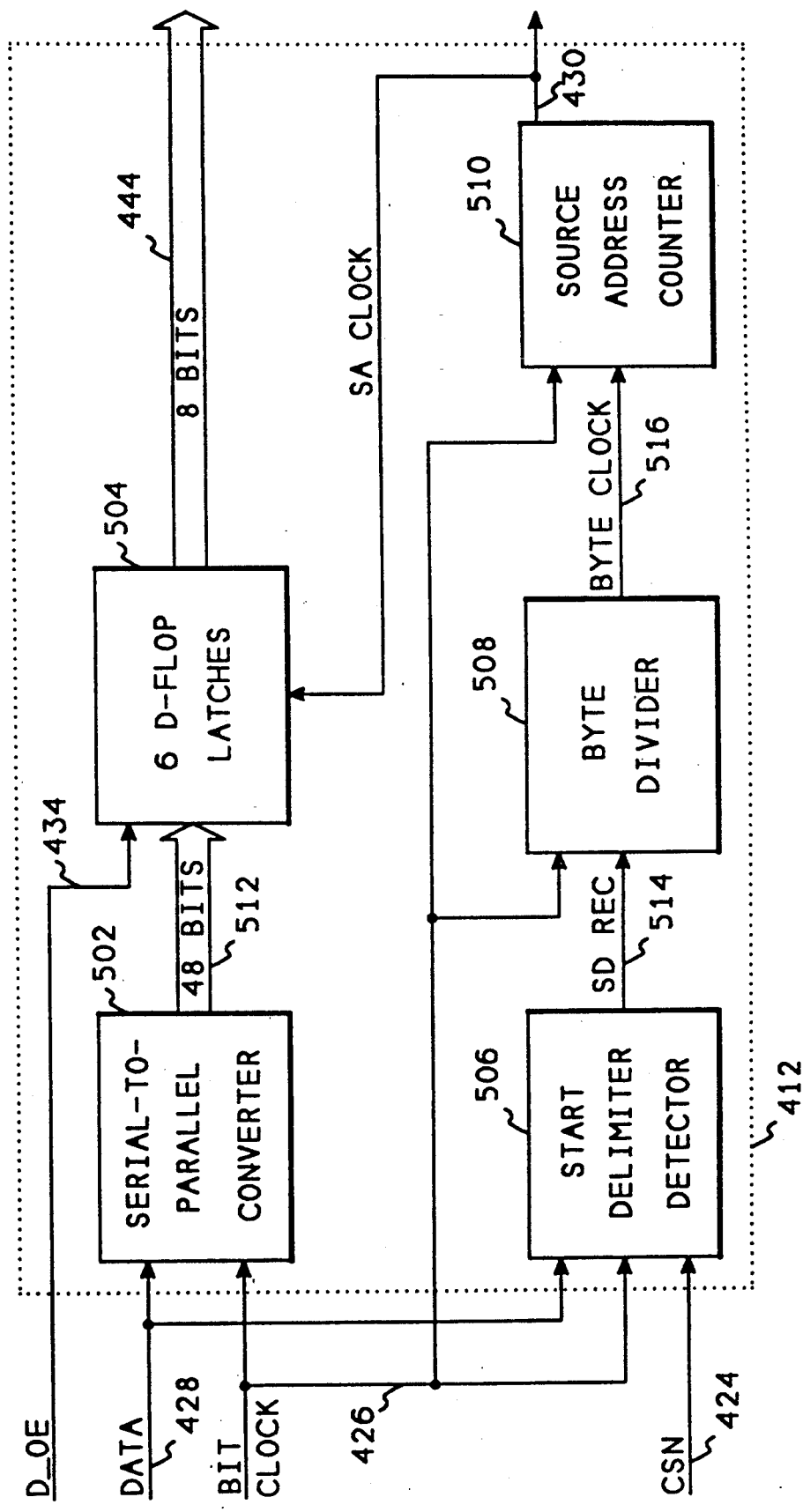
FIG. 5 a block diagram of the source address stripper circuit of FIG. 4.

FIG. 5 shows a block diagram of the source address stripper 412 of FIG. 4. Referring now to FIG. 5, a serial to parallel converter circuit 502 receives the data 428 and bit clock 426 signals from the clock extract phase locked loop circuit 406 (FIG. 4). After converting the data to parallel, the serial to parallel converter 502 sends this data over an eight-bit bus 512 to a D-flop latch 504 which latches the data prior to it being sent over another eight-bit bus 444 to the eight-bit FIFO 416 (FIG. 4). The D_OE signal 434 from the controller 410 (FIG. 4) gates the data from the D-flop latch 504 onto the bus 444.

Data 428 and bit clock 426 are also connected to a start delimiter detector 506. When the start delimiter detector 506 receives the carrier sense signal 424, its starts examining the data 428 until it recognizes the start delimiter byte pattern 306 (FIG. 3). When the start delimiter pattern is detected, the start delimiter detector 506 sends the SD REC signal 514 to a byte divider circuit 508. After receiving the SD REC signal 514, the byte divider circuit 508 divides the bit clock 426 by eight to create a byte clock signal 516 which is sent to a source address counter circuit 510. The byte clock signal 516, because it is gated by SD REC 514 and carrier sense 424 synchronizes the bytes within the information frame. The source address counter circuit 510 will ignore the first six byte clock 516 signals since they clock bytes for the destination address, and will pass the next six byte clock signals 516 to become the source address clock 430. The source address clock 430 is connected to the D-flop latch 504 to latch the eight parallel bits on signal 512. The SA clock signal 430 also is sent to the controller 410 which uses the signal to activate the D_OE 434 and store the parallel bits into the FIFO 416 (FIG. 4). After the SA clock signal has activated six times, once for each of the source address bytes, the end signal 432 will be activated and sent to the controller 410. In the manner described above, the circuit of FIG. 5 will select the six source address bytes from the incoming information frame, convert them to parallel data, and send each of the six bytes over the eight-bit parallel bus 444.

Figure 6:
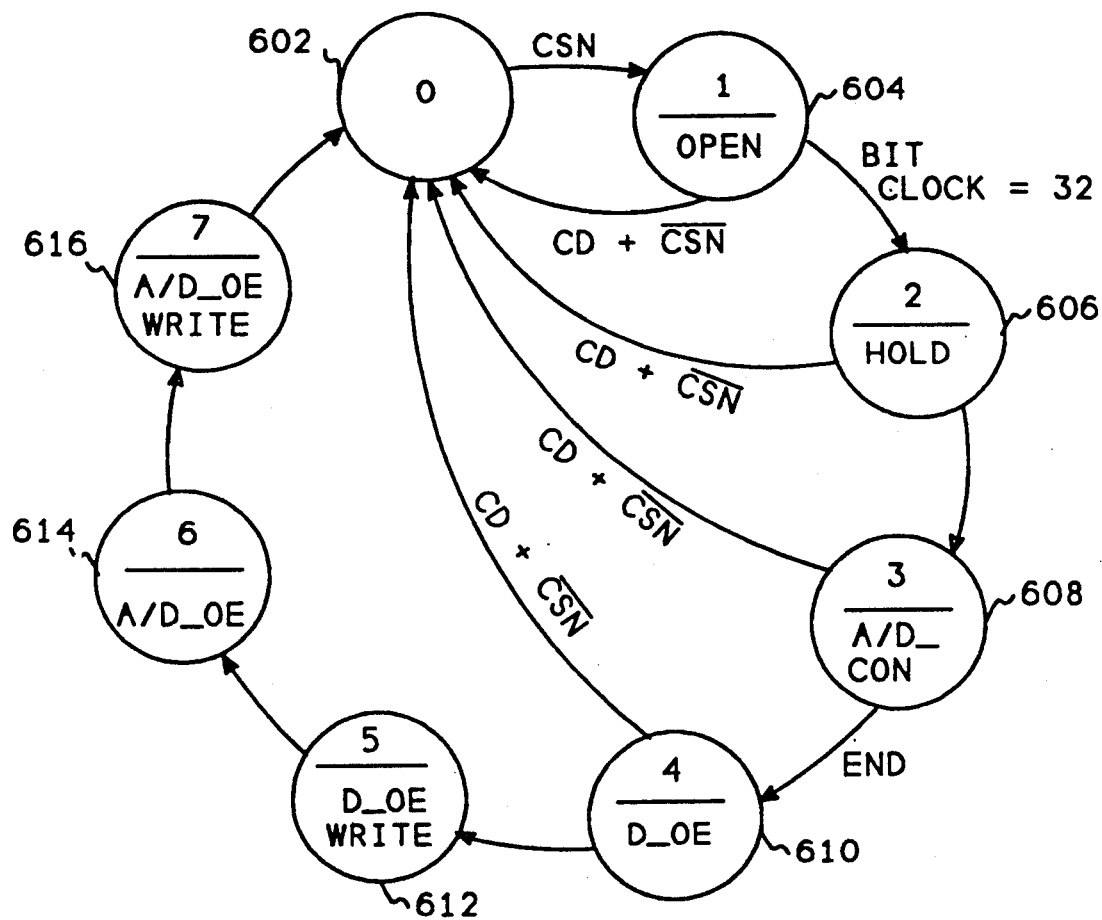
FIG. 6 shows a state diagram of the controller circuit of FIG. 4.

FIG. 6 shows a state diagram of the controller circuit 410 of FIG. 4. This state diagram will be described in conjunction with the block diagram FIG. 4. Referring now to FIGS. 6 and 4, the controller starts in State 0 602. When the carrier sense (CSN) signal 424 is received, the controller goes to State 1 604 and sends the open signal 436 to the sample and hold circuit 408. This causes the sample and hold circuit 408 to start sampling the output of the five megahertz filter and amplifier 404. After thirty-two bit clocks, the controller goes to State 2 606, drops the open signal 436 and asserts the hold signal 438 to the sample and hold circuit 408 which causes it to hold the value accumulated for the analog level of the network signal. If a collision is detected, or the carrier sense drops while the controller in States 1 through 4, the controller goes back to State 0 since the frame will be incomplete and no information can be accumulated from it. After sending the hold signal, the controller goes to State 3 608, drops the hold signal and asserts the A/D CONV signal 442 to cause the analog-to-digital converter circuit 414 to convert the output of sample and hold circuit 408 into a digital value.

The controller then goes to State 4 610 to start the process of storing the source address into the FIFO 416. State 4 610 asserts the D_OE signal 434 and then State 5 612 maintains the D_OE signal 434 and also asserts the write signal 450 to write the source address into the FIFO 416. After all six bytes have been written into the FIFO 416 and the SA clock signal 430 is received, the controller goes to State 6 614. State 6 614 sends the A/D_OE signal 440 to the analog-to-digital converter 414 to cause it to gate the parallel converted output signal to the FIFO 416. The controller then goes to State 7 616 which maintains the A/D_OE signal 440 and also asserts the write signal 450 to write the digital value into the FIFO 416. The controller then goes back State 0 602 to wait for the next information frame.

Figure 7:
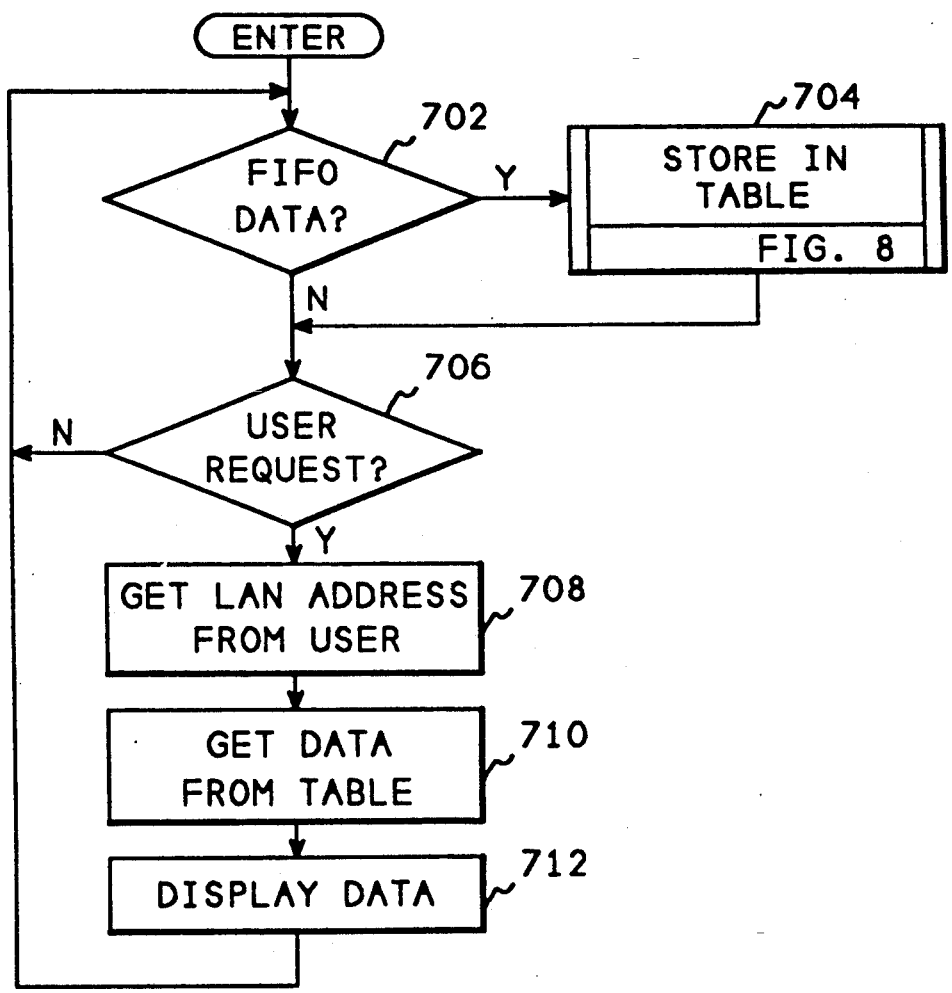
FIG. 7 shows a flowchart of the top level of the software of the invention.
Figure 8:
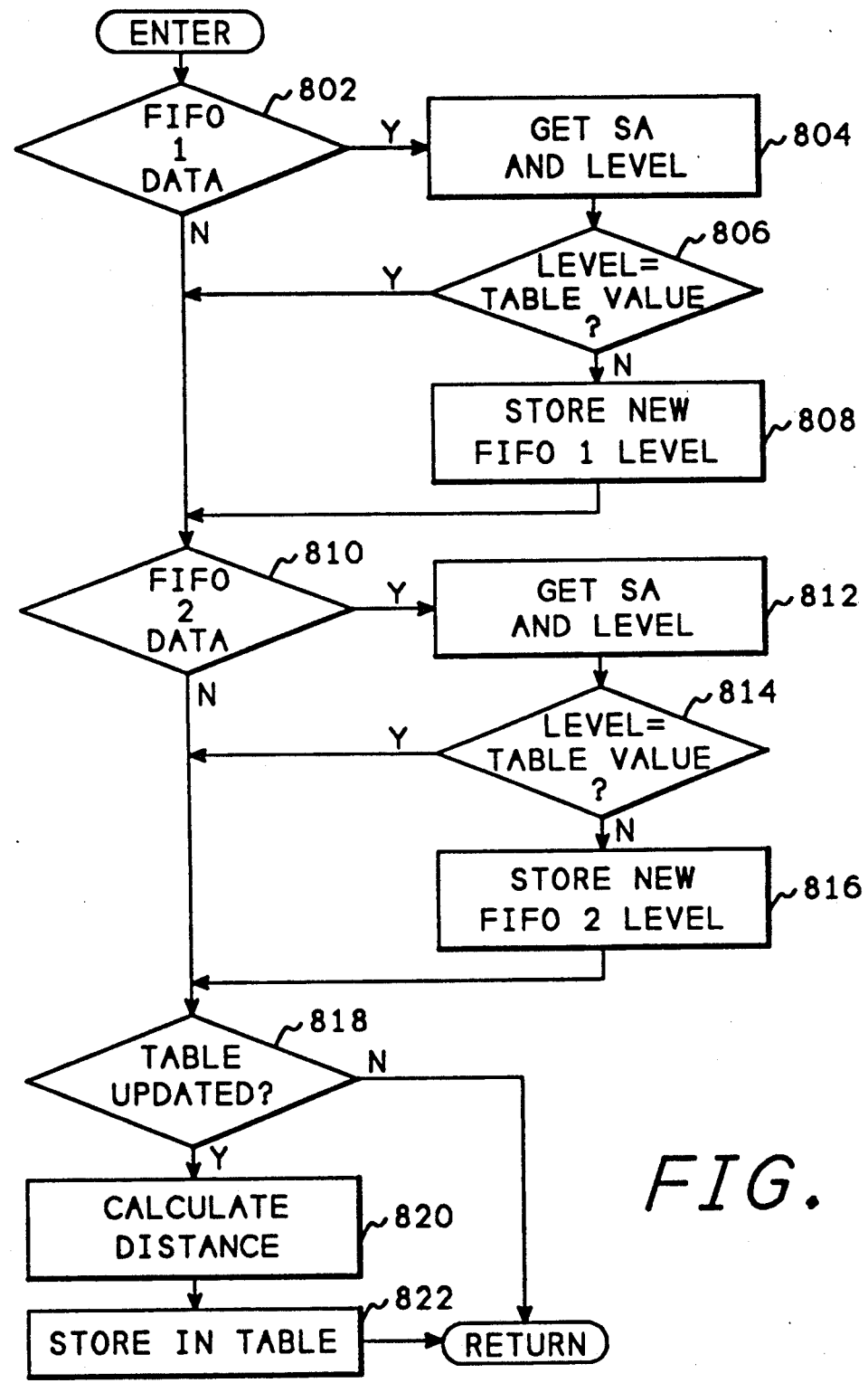
FIG. 8 shows a flowchart of the store table function of the software of the invention.

FIG. 7 shows a flowchart of the top level of the software of the invention. The purpose of the software described in FIGS. 7 and 8 is to correlate the data collected in the FIFOs in the two LAN monitors of the system. The software collects the digital values for the transmission levels measured at each LAN monitor for each information frame, and using these levels it computes the location of the node that sent the information frame.

Referring now to FIG. 7, after entry, block 702 determines whether any FIFO data is available in the FIFOs of either of the LAN monitors. If data is available, block 702 transfers to block 704 which calls FIG. 8 to store the data into a table. After storing the FIFO data in the table, or if no FIFO data was available, control goes to block 706 which determines whether a user request has been input. If a user request has been input, block 706 transfers to block 708 which gets the LAN address from the user. Block 710 then gets the location of that node from the table and block 712 displays the location to the user before returning to block 702.

FIG. 8 is a flowchart of the store table function of the software. Referring now FIG. 8, after entry, block 802 determines whether there is data available in the first LAN monitor FIFO. If data is available in the first LAN monitor FIFO, block 802 transfers to block 804 which reads the source address and the signal level from the first FIFO, and determines whether the signal level read is equal to the value already stored in the table for that source address. If the value is the same as that already stored in the table, no new table entry is made, and block 806 transfers to block 810. The table entry contains the node address and the signal levels from both FIFOs. If the level obtained from the FIFO is different from the level stored in the table, block 806 transfers to block 808 which stores the new level in the table before transferring to block 810. Block 810 determines whether the FIFO in the second LAN monitor has data. If this FIFO has data, block 810 transfers to block 812 which gets the source address and level values from the FIFO. Block 814 then determines whether the level already stored in the table is the same as the level just read from the FIFO. If the levels are the same, block 814 transfers to block 818 since the table does not need to be updated. If the levels are different block 814 transfers to block 816 which stores the new level value from the FIFO in the second LAN monitor into the table. Block 818 then determines whether the table was updated by one of the above processes. If the table has been updated, a new location needs to calculated, so block 818 transfers to block 820. Block 820 calculates the distance from the center of the cable to the node, using the following formula:

$$\text{Distance} = \frac{10 \text{ LOG(Level 1/Level 2)}}{\text{Loss in dB per foot}}$$

If the Distance value is positive, the node is in a direction toward the first LAN monitor from the center, and if Distance is negative, the node is in a direction toward the second LAN monitor from the center. Thin LAN cable has a loss of 0.0098 dB per foot, and thick LAN cable has a loss of 0.0033 dB per foot. After computing the distance, block 822 stores this value into the table before returning to FIG. 7.

The following are examples of computing this distance for thin LAN cable:

EXAMPLE 1

Level 1=0.7980, Level 2=0.6368

Distance=( (10 * LOG (0.7980 / 0.6368)) ) / 0.0098 =100

Therefore the node is located 100 feet from the center of the cable, on the side of the cable nearest LAN monitor 1.

EXAMPLE 2

Level 1=0.35, Level 2=0.99

Distance=( (10 * LOG (0.35 / 0.99)) /0.0098) = −461

Therefore, the node is 461 feet away from the center of the cable, and on the side of the cable opposite LAN monitor 1. Also, since the Level 2 value is approximately one, which is the required transmitted voltage level, the node is located approximately coincident with LAN monitor two, therefore, the length of the cable is approximately 922 feet.

Steps could be inserted between blocks 804 and 806, as well as between blocks 812 and 814, to compare the level to a threshold value. This threshold value would be the minimum level that the node is required to send, and if the signal level was below the minimum, an error message would be displayed.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A system for determining a location of a node sending a signal through a cable of a local area network, said system comprising:

a first signal level determining means connected at a first end location on said cable, said first signal level determining means producing a first digital signal level for a preamble of said signal when said preamble is detected in said cable, said first signal level determining means comprising bandpass filter means for removing any components of said signal having a frequency outside a fundamental frequency of said preamble of said signal, sample and hold means for determining an analog signal level of an output of said bandpass filter means and for maintaining said analog signal level over a period of time, and analog to digital conversion means for converting said analog signal level to said first digital signal level;

a second signal determining means connected at a second end location on said cable, said second signal level determining means producing a second digital signal level for a preamble of said signal when said preamble is detected in said cable, said second signal level determining means comprising bandpass filter means for removing any components of said signal having a frequency outside a fundamental frequency of said preamble of said signal, sample and hold means for determining an analog signal level of an output of said bandpass filter means and for maintaining said analog signal level over a period of time, and analog to digital conversion means for converting said analog signal level to said second digital signal level;

calculating means connected to said first digital signal level determining means and said second digital signal level determining means for determining said location of said node.

2. The system of claim 1 further comprising display means connected to said calculating means for displaying said node location.

3. The system of claim 1 wherein said calculating means further comprises means for comparing said first and second digital signal levels to a predetermined level value and displaying an error if either of said digital signal levels is below said predetermined level value.

4. The system of claim 1 wherein said first and second signal level determining means each further comprise:
means for extracting a node address from said signal.

5. The system of claim 4 wherein said first and second signal level determining means each further comprising interface means for sending said first and second digital signal levels and said node address to said calculating means.

6. The system of claim 5 wherein said first and second signal level determining means each further comprise storage means for storing said first and second digital signal levels and said node addresses.

7. The system of claim 1 wherein said calculating means comprises:
means for dividing said first digital signal level by said second digital signal level to provide a quotient digital signal level;
means for computing a base ten logarithm of said quotient digital signal level;
means for multiplying said base ten logarithm of said quotient digital signal level by ten to provide a raw distance value;
means for dividing said raw distance value by a decibel signal loss per foot of said cable to provide a computed distance of said node relative to a center of said cable; and
means for computing said location of said node at said computed distance from said center toward said first signal level determining means when said computed distance is positive and computing said location of said node at said computed distance from said center toward said second signal level determining means when said computed distance is negative.

8. A system for determining a location of a plurality of nodes, wherein each of said nodes sends one or more signals through a cable of a local area network, said system comprising:
a first signal level determining means connected at a first end location on said cable, wherein said first signal level determining means producing a plurality of first digital signal levels, one for a signal level of a preamble of each of said signal sent by said plurality of nodes, said first signal level determining means comprising
bandpass filter means for removing any components of each of said signal having a frequency outside a fundamental frequency of said preamble of each of said signals,
sample and hold means for determining an analog signal level of each output of said bandpass filter means and for maintaining each said analog signal level over a period of time, and
analog to digital conversion means for converting each said analog signal level to one of said first digital signal levels;
a second signal determining means connected at a second end location on said cable, wherein said second signal level determining means producing a plurality of second digital signal levels, one for a signal level of said preamble of each of said signals sent by said plurality of nodes, said second signal level determining means comprising
bandpass filter means for removing any components of each of said signal having a frequency outside a fundamental frequency of said preamble of each of said signals,
sample and hold means for determining an analog signal level of each output of said bandpass filter means and for maintaining each said analog signal level over a period of time, and
analog to digital conversion means for converting each said analog signal level to one of said second digital signal levels;
first address combining means, connected to said first signal level determining means, for combining a node address from each of said signals with a corresponding one of said first digital signals levels;
second address combining means, connected to said second signal level determining means, for combining a node address from each of said signals with a corresponding one of said second digital signals levels; and
calculating means connected to said first signal level determining means and said second signal level determining means for determining said location of a node sending each of said signals.

9. The system of claim 8 wherein said first and second signal level determining means each further comprise:
interface means for sending each of said digital signal levels with said combined node address to said calculating means.

10. The system of claim 9 wherein said first and second address combining means each further comprise storage means for storing said digital signal levels and said combined node addresses.

11. The system of claim 10 wherein said first and second address combining means each further comprise:
means for determining a start delimiter value in each of said signals;
means for skipping over a destination address value in each of said signals; and
means for converting a source address value in each of said signals to said node address for said signal.

12. The system of claim 11 wherein said calculating means further comprises means for combining a first digital signal level from said first signal level determining means, said digital signal level having a combined first node address, and a second digital signal level from said second signal level determining means, said second digital signal level having a combined second node address identical to said first combined node address of said first digital signal level, to produce an element of a table for each node address, each said element having said first digital signal level, said second digital signal level, and said identical node address.

13. The system of claim 12 wherein said calculating means further comprises:
means for selecting each of said elements of said table;
means for dividing said first combined digital signal valve of a selected element by said second combined digital signal level of said selected element to provide a selected quotient digital signal level;
means for computing a base ten logarithm of said selected quotient digital signal level;
means for multiplying said selected base ten logarithm of said selected quotient digital signal level by ten to provide a selected raw distance value;
means for dividing said selected raw distance value by a decibel signal loss per foot of said cable to provide a selected computed distance of said node of said selected element relative to a center of said cable; and means for computing a location of a node corresponding to said selected element at said selected computed distance from said center toward said first signal level determining means when said selected computed distance is positive and computing a location of said node at said selected computed distance from said center toward said second signal level determining means when said selected computed distance is negative.

14. A process for determining a location of a plurality of nodes, wherein each of said nodes sends one or more information signals through a cable of a local area network, said process comprising the steps of:
 (a) determining, at a first end location on said cable, a plurality of first digital signal levels, one for a preamble of each of said information signals detected in said cable, said determining comprising the steps of
  (a2) filtering each of said information signals to remove any components of each of said information signals, wherein said components have a frequency outside a fundamental frequency of said preamble of each of said information signals, and to produce a filtered signal for each of said information signals;
  (a3) determining an analog signal level of each of said filtered signals;
  (a4) converting each of said analog signal levels to one of said digital signal levels;
 (a) determining, at a second end location on said cable, a plurality of second digital signal levels, one for a preamble of each of said information signals detected in said cable, said determining comprising the steps of
  (b2) filtering each of said information signals to remove any components of each of said information signals, wherein said components have a frequency outside a fundamental frequency of said preamble of each of said information signals, and to produce a filtered signal for each of said information signals;
  (b3) determining an analog signal level of each of said filtered signals; and
  (b4) converting each of said analog signal levels to one of said digital signal levels;
 (c) combining a node address form each of said information signals with a corresponding one of each of said first digital signal levels;
 (d) combining a node address form each of said information signals with a corresponding one of each of said second digital signal levels;
 (e) combining said first and second digital signal levels and node address for each of said information signals; and
 (f) calculating said location of each node sending each of said information signals from said combined digital signal levels and said combined node addresses.

15. The process of claim 14 further comprising the step of:
 (g) displaying said node locations and said corresponding combined node addresses.

16. The process of claim 14 wherein steps (c) and (d) further comprises the step of:
 (c1) storing said first digital signal level and said combined node address prior to said calculating step; and
 (d1) storing said second digital signal level and said combined node address prior to said calculating step.

17. The process of claim 16 wherein steps (c1) and (d1) further comprises the step of:
 (c1a) detecting a start delimiter value in each of said information signals;
 (c1b) skipping a destination address value in each of said information signals;
 (c1c) converting a source address value in each of said information signals to said node address of said information signal;
 (c1d) combining said node address with a corresponding stored digital signal level;
 (d1a) detecting a start delimiter value in each of said information signals;
 (d1b) skipping a destination address value in each of said information signals;
 (d1c) converting a source address value in each of said information signals to said node address of said information signal;
 (d1d) combining said node address with a corresponding stored digital signal level.

18. The process of claim 14 wherein step (e) further comprises the steps of:
 (e1) comparing each second digital signal level node address to each second digital signal level node address;
 (e2) when one of said first digital signal level node addresses equals one of said second digital signal level node addresses, combining said first digital signal level having said equal node address and said second digital signal level having said equal node address to produce a first combined digital signal level and a second combined digital signal level; and
 (e3) storing said first and second combined digital signal levels and said compared node address as an element of a table.

19. The system of claim 18 wherein step (f) further comprises the step of:
 (f1) selecting each of said elements of said table;
 (f2) dividing said first combined digital signal valve of a selected element by said second combined digital signal level of said selected element to provide a selected quotient digital signal level;
 (f3) computing a base ten logarithm of said selected quotient digital signal level;
 (f4) multiplying said selected base ten logarithm of said selected quotient digital signal level by ten to provide a selected raw distance value;
 (f5) dividing said selected raw distance value by a decibel signal loss per foot of said cable to provide a selected computed distance of said selected node relative to a center of said cable; and
 (f6) computing a location of a node corresponding to said selected element at said selected computed distance from said center toward said first signal level determining means when said selected computed distance is positive and computing a location of said node at said selected computed distance from said center toward said second signal level determining means when said selected computed distance is negative.

* * * * *

UNITED STATES PATENT AND TRADEMARK OFFICE
CERTIFICATE OF CORRECTION

PATENT NO. : 5,198,805
DATED : 3/30/93
INVENTOR(S) : Charles H. Whiteside, Stephen M. ERnst It is certified that error appears in the above-identified patent and that said Letters Patent is hereby corrected as shown below:

Col. 9, line 5 - "comprising" to --comprise--

Col. 9, line 60 - "producing" to --produces--

Col. 9, line 66 - "signal" to --signals--

Col. 10, line 56 - "valve" to --level--

Col. 12, line 29 - "second" to --first--

Col. 12, line 46 - "valve" to --level--

Signed and Sealed this

Twenty-ninth Day of March, 1994

Attest:

BRUCE LEHMAN

Attesting Officer    Commissioner of Patents and Trademarks